(12) United States Patent
Livingood (10) Patent No.: US 12,438,848 B2
(45) Date of Patent: Oct. 7, 2025

(54) DISCOVERY AND ASSIGNMENT OF PRIVACY-PROTECTING RELAYS IN A NETWORK

(71) Applicant: Comcast Cable Communications, LLC, Philadelphia, PA (US)

(72) Inventor: Jason Livingood, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 83 days.

(21) Appl. No.: 18/323,889

(22) Filed: May 25, 2023

(65) Prior Publication Data

US 2024/0396878 A1    Nov. 28, 2024

(51) Int. Cl.
*H04L 9/40* (2022.01)
(52) U.S. Cl.
CPC ...... *H04L 63/0281* (2013.01); *H04L 63/0823* (2013.01); *H04L 63/166* (2013.01)
(58) Field of Classification Search
None
See application file for complete search history.

(56) References Cited

U.S. PATENT DOCUMENTS

| 2014/0122580 A1* | 5/2014 | Nuaimi | H04L 63/0281 709/203 |
| 2017/0155623 A1* | 6/2017 | Smith | G06F 9/505 |
| 2023/0412701 A1* | 12/2023 | Pilkauskas | H04L 67/563 |

\* cited by examiner

*Primary Examiner* — Brian Whipple
(74) *Attorney, Agent, or Firm* — BakerHostetler (57) ABSTRACT

Methods and systems are disclosed for discovery and assignment of privacy-protecting proxies/relays in a network. As an example, a gateway device located at a premises may send a request for data indicating one or more privacy-protecting proxies (PPPs) available to the gateway device, to a network device located external to the premises. The gateway device may select a PPP from the one or more PPPs available to the gateway device based on one or more predetermined criteria useful for selecting a PPP. The selected PPP may be assigned to a user device located at the premises by the gateway device. The assignment may be based on the selected PPP being trusted. Data associated with the user device may be routed via the assigned PPP. If the selected PPP is untrusted, data associated with the user device may be routed without using the selected and assigned PPP.

20 Claims, 6 Drawing Sheets

DISCOVERY AND ASSIGNMENT OF PRIVACY-PROTECTING RELAYS IN A NETWORK

BACKGROUND

Many people use a Virtual Private Network (VPN) to protect the privacy of their source network address (IP Address) and geographic location. However, VPNs are not a catch-all solution for every user that wants to protect this information. For example, VPNs require tunneling all traffic to a central point and putting all of the user's trust in the VPN provider, who can observe the traffic and potentially monetize that data. Additionally, services that require knowledge of a user's location might run into problems because content localization, on which most of the content of the Internet depends today, breaks when the user's true location is hidden behind a VPN. This can cause access times and downloads to be dramatically slower, latency to increase, and cause problems for various services such as video conferencing and gaming. Therefore, new ways for users to use trusted privacy protecting services without causing content localization breaks is needed.

SUMMARY

Methods and systems are disclosed for discovery and assignment of privacy-protecting proxies/relays in a network. A network of different privacy-protecting proxies may be used to obfuscate user information, such as network (e.g., Internet Protocol (IP) address) and location information. A network device, such as a home gateway device (e.g., home router), may determine whether usage of a proxy is appropriate or not for a particular computing device on the Local Area Network (LAN) inside the home. If a proxy would prevent a service on the computing device from functioning, the network device may determine not to use the proxy. If the service requires location information, a proxy may be selected based on proximity to a location of the computing device (e.g., for Content Delivery Network (CDN) content, city/town level location data may be used). The network device may apply proxy determinations for different data flows associated with the same computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Existing privacy-protection services (hereinafter simply "privacy services") may employ a virtual private network (VPN) device, or other type of privacy proxy, that may obfuscate the source IP address of packets emanating from a router or home gateway device on a service provider network, as well as the geographic location of the user. For example, in one scenario, a user may wish to use their device to access content available on the internet. To this end, a client application, such as a web browser that is running on the user device, may send one or more messages, in the form of one or more packets, to the service provider via the home gateway device and then the service provider network requesting access to the content.

With the advent of the aforementioned privacy services, a relay/VPN/proxy device or server, such as the privacy-protecting proxies (PPPs), operated by such a privacy service may intercept some or all of the packets and obfuscate the source IP address of the user's home gateway device or user device. The goal of the privacy service may be to make it difficult, or otherwise impossible, for recipients of the packets to know the true identity of the source of the packets. This may facilitate added privacy, because the source IP address of the transmitted packets no longer matches the known IP address of the user. Additionally, the geographic location of the user is also typically obfuscated as an additional layer of privacy protection. However, these services have traditionally added a performance penalty and have been located outside of a service provider network, somewhere on the internet and potentially in another country. But by using new technologies and standards, it is now possible for a service provider network to provide these privacy services directly on their network. In doing so, the service provider network may obfuscate the user's IP address and detailed geographic location, while not making the user suffer a traditional performance penalty when using such a privacy service. This may be done by leveraging the privacy services hosted on the network, while hiding detailed network location, that still shares high level geographic location (e.g., city), as well as network location (e.g., service provider A), so that CDNs and other destinations can still perform effective content localization. This may permit the CDN to have sufficient information to direct a user's connection to a geographically close destination server and one that leverages high-capacity interconnections between the service provider network and CDN. Furthermore, the CDN content may even be hosted within the service provider network itself. The result is that the user gets privacy services that does not entail a performance penalty. Described herein are improved methods, systems, and apparatus for discovery and assignment of privacy-protecting proxies/relays in a service provider network.

Figure 1:
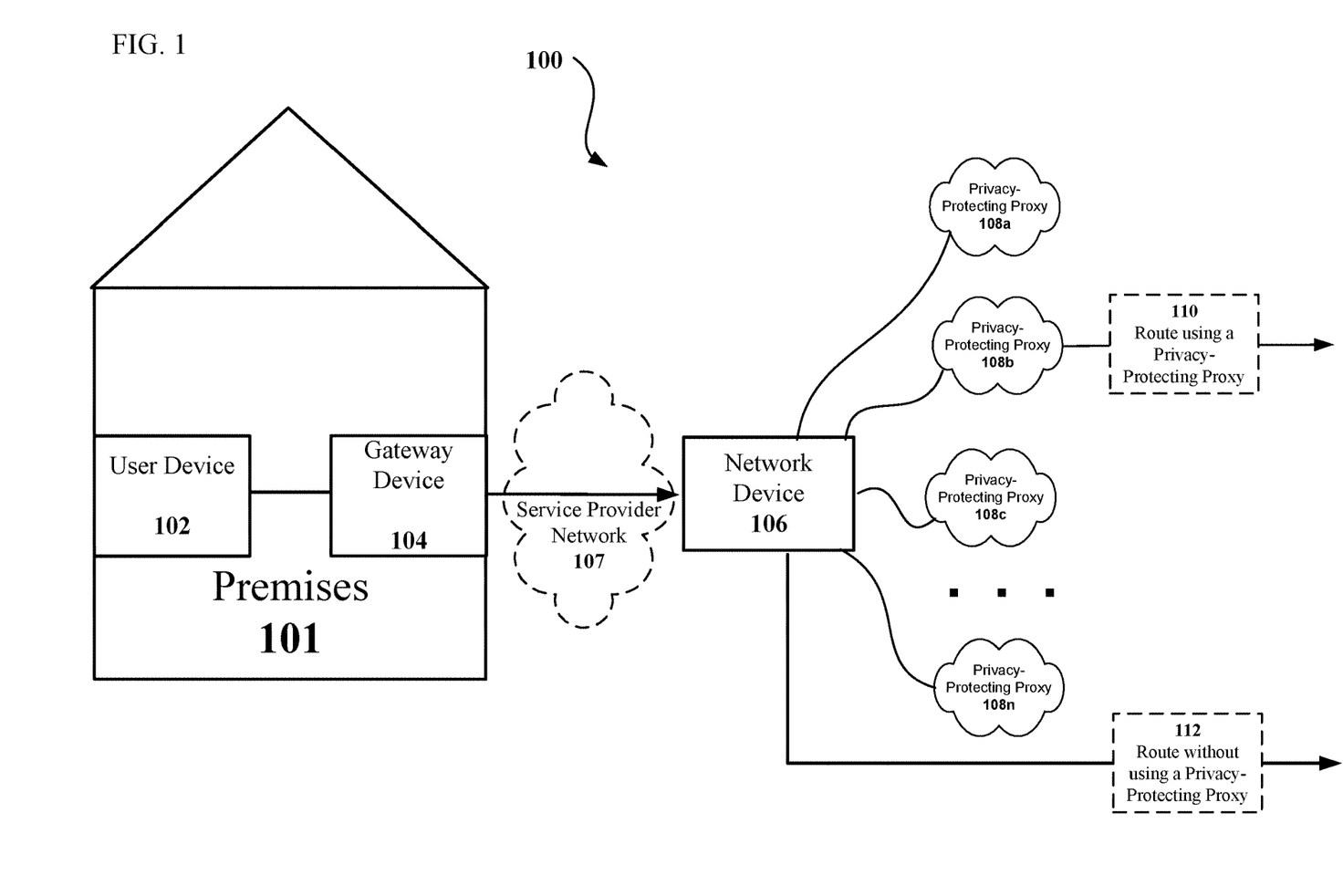
FIG. 1 shows an example system.

FIG. 1 shows an example system 100. The system 100 may comprise various devices located, for example, at a premises 101. The premises 101 may comprise a home, a business, or any other bounded geographic location.

The system may comprise a user device 102 located at premises 101. The user device 102 may comprise, for example, a laptop computer, a desktop computer, a mobile phone, a television, a set-top box, a tablet, a wearable computing device, a mobile computing device, or any other computing device configured to receive and/or output network traffic.

The user device 102 may be configured to host an application that a user may use to facilitate access to a service or content provided by a service provider or content distributor. The application may comprise a streaming client application that may connect to a server of a content distributor in order to request and receive content from the content distributor. The user device 102 may be configured to receive recorded content items in a particular file format such as a hypertext transport markup language (HTML) document defined by the Internet Engineering Task Force (IETF), World Wide Web Consortium (W3C), or the like. The user device 102 may be configured to receive the content and output the content for consumption by the user. The user device 102 may be configured to receive live streamed content and playback the live streamed content, such as a live broadcast of a football game. The user device 102 may be a premises device, such as an automation device, a security device, an internet-of-things (IoT) device, a smart thermostat, a camera, a door lock, a sensor, or an appliance (e.g., refrigerator, washer, dryer, oven), personal computer, tablet, mobile phone, gaming console, smart TV, or other interactive user device.

A gateway device 104 may also be located at the premises 101. The gateway device 104 may comprise an access point, router, switch, media player, premises controller, security controller, automation controller, or any combination thereof. The gateway device 104 may provide access to a network device 106 of a service provider. The service provider may also operate as a content distributor. The service provider may provide users with access to a variety of services or content. The gateway device 104 may be configured to enable user devices, such as user device 102, to establish a wired or wireless connection to the gateway device 104 for purposes of communicating with the gateway device 104 and other network apparatuses beyond the gateway device 104, such as network device 106. The gateway device 104 may be configured to establish a wired and/or wireless local area network to which the devices may connect. For purposes of communicating wirelessly, the gateway device 104 may implement a wireless access technology, such as the IEEE 802.11 ("Wi-Fi") radio access technology. In other implementations, other radio access technologies may be employed, such as IEEE 802.16 or 802.20 ("WiMAX"), IEEE 802.15.4a ("Zigbee"), or 802.15.3c ("UWB"). For purposes of communicating with the router/gateway device 104 via a wired connection, the gateway may be configured to implement a wired local area network technology, such as IEEE 802.3 ("Ethernet") or the like.

The gateway device 104 may be configured to communicate with the network device 106 via a service provider network 107. The gateway device 104 may communicate with the network device 106 via any of a variety of communications mediums, such as a coaxial cable network, a fiber-optic cable network, a hybrid fiber-coaxial (HFC) network, a satellite transmission channel, or the like. When part of a cable television system, a service provider network may comprise a cable modem termination system (CMTS) or virtual CMTS (vCMTS).

The gateway device 104 may have an associated network address that uniquely identifies the gateway device 104 on the service provider network 107. The network address may comprise, for example, an internet protocol (IP) address. The gateway device 104 may be configured to perform network address translation (NAT) when sending packets of data from a user device, such as user device 102, to the network device 106 on the service provider network. Such network address translation may involve changing a source address in the header of packets received from the user device and destined for the service provider network 107, from the local IP address of the user device to the network address (e.g., IP address) of the gateway device 104 on the service provider network.

The service provider network may provide various services to user devices, such as user device 102, and may include the appropriate infrastructure for these services. For example, the service provider network 107 may include one or more network devices, such as network device 106. Network device 106 may comprise one or more termination systems (e.g., cable modem termination system), servers, edge routers, and/or the like, which may provide connectivity to other networks, including the Internet, a telephone network, or the like. The network device 106 or gateway device 104 may be configured to manage one or more PPPs, such as PPPs 108a-108n. The network device 106 or gateway device 104 may be configured to select one of the one or more PPPs that the network device 106 or gateway device 104 manages based on selection criteria for routing by a user device, such as user device 102. The selection criteria may be based on a user selection. For example, a user via user device 102, may select a PPP from the available PPPs 108a-108n based on the user's preference for where the user wishes to appear geographically. For example, a user might want to use a PPP that would route the user's data to a specific location, such as one that is known to be the closest to a particular type of content with which the user wishes to access or interact (e.g., a specific gaming server). The selection criteria may be based on the available network or computational capacity of a PPP to route traffic, such that, for example, PPPs with the greatest available capacity are preferred or the greatest network capacity to a particular CDN or other destination. The network device 106 or the gateway device 104 may be configured to assign the selected PPP, such as PPP 108b, to a user device, such as user device 102 for routing. The network device 106 or the gateway device 104 may assign the PPP 108b based on it determining that the PPP 108b is trusted. The network device 106 or the gateway device 104 may also be configured to provide usage reports back to the user concerning their usage of the PPP service, such as the amount of time, volume of data, types of applications used, threats against which they were protected, etc.

The selection of the PPP 108b and assigning of the PPP 108b may be performed in a single step or a series of steps. Once a PPP is selected and assigned, such as PPP 108b, data may be routed using that PPP, as shown in routing decision 110. However, data may also be routed without using the selected (e.g., and assigned) PPP, as shown in routing decision 112. Routing decision 112 may be determine even if a PPP has been selected and assigned. Each routing decision, 110 and 112, may be determined for portions of data as well.

The service provider network 107 may provide user devices, such as user device 102, with access to a content delivery network, which may comprise one or more content servers (not shown) that are configured to send, e.g., stream, content to such user devices. The content server(s) may be configured to send, to a user device and based on a request from the user device, a variety of different types of content, including live content, video-on-demand content, or other content. The service provider network 107 may comprise or facilitate access to application servers that provide services, such as automation, security, privacy, premises management, and the like.

As mentioned above, the gateway device 104 may be configured to perform network address translation (NAT) when sending packets of data from a user device, such as user device 102, to the service provider network 107. Such network address translation may involve changing a source address in the header of packets received from the user device and destined for the service provider network 107, from the local IP address of the user device to the network address (e.g., IP address) of the gateway device 104. In the past, the source IP address of packets emanating from the gateway device 104, which would be the known IP address of the gateway device 104 on the service provider network, could be relied upon as a basis for determining that the user device 102 that initiated the sending of the packet is located at the premises associated with the gateway device 104 (e.g., premises 101)—for example, in order to enforce geographical restrictions placed on the delivery of a particular service or particular content. If a packet requesting access to the service or content was received from the user device 102 that did not have a source IP address that matched the known IP address of the gateway device 104, entities associated with the service provider network 107, such as the network device 106, could assume that the user device 102 was not located at the premises and could, for example, deny access to the requested service or content based on geographic restrictions, for example. With the advent of new privacy products and services, however, the situation has become more complicated.

For example, the network device 106, which is part of the service provider network 107, may have numerous PPPs available for a user device, such as user device 102. Gateway device 104, located at a premises 101, may send a request to the network device 106, such as a Dynamic Host Configuration Protocol (DHCP) server, for data indicating one or more PPPs 108a-108n available to the gateway device 104. The request may be sent as a DNS query. The available PPPs may operate under the Multiplex Application Substrate over QUIC Encryption (MASQUE) standard from the IETF. Other standards such as DNS Queries over HTTPS (DoH), DNS over Transport Layer Security (DOT), Oblivious DNS over HTTPS (ODoH0), DNS over QUIC (DoQ), and others are also acceptable, none of which are limiting. The MASQUE standard provides the basic framework for a multi-layer PPP system, the essential basic building blocks. But the standard does not explore methods or systems of implementation and the types of unique features that could be offered.

The gateway device 104 may select a PPP of the one or more PPPs 108a-108n available based on selection criteria. The selection criteria may be location information. For example, the gateway device 104 may receive the location information associated with each available PPP 108a-108n and then compare the location information associated with the gateway device 104 at the premises 101 to each of the PPPs' 108a-108n location information to determine which PPP has a location closest to the gateway device. The selection criteria may be a user selection. For example, a user via user device 102, may select a PPP from the available PPPs 108a-108n based on the user's preference. For example, a user might want to use a PPP that would route the user's data to a specific location. The selection criteria may be the capacity of a PPP to route traffic.

The gateway device 104 may select a PPP for the user device's traffic because the location of user device 102 is associated with a privacy setting. For example, the user device 102 may attempt to access a banking website which may be associated with an increased privacy level. The gateway device 104 may also determine that the selected PPP is a trusted device. The gateway device 104 may determine the selected PPP is trusted by verifying a Transport Layer Security (TLS) certificate associated with the selected PPP. The gateway device 104 may determine the selected PPP is trusted by verifying the Domain Name Service (DNS) record associated with the selected PPP. If the gateway device 104 determines that the selected PPP is trusted, the gateway device 104 may assign the selected PPP to the user device 102, such as PPP 108b. The selection of the PPP 108b and/or assigning of the PPP 108b may be performed in a single step or a series of steps. The gateway device 104 may determine to route at least a portion of the data associated with the user device 102 through the selected (e.g., and assigned) PPP, as shown in routing decision 110. The selected PPP may change the source IP address of the packets to an IP address associated with that PPP. The gateway device 104 may additionally route a second portion of the data associated with the user device without using the selected PPP, as shown in routing decision 112, based on the second portion of the data being associated with a service condition. A service condition may be a requirement by the user device 102 or gateway device 104 to use local location information of the user device 102 to access a particular service. By routing data in a traditional manner without using the selected PPP, as shown in routing decision 112, then the local location information of the user device 102 may still be available for content localization services. For example, the user device 102 might be a smart thermostat, which may need to disclose location data to properly heat or cool a room. Routing a portion of data without using the selected PPP, may not result in the selected PPP becoming deselected or reassigned elsewhere.

The gateway device 104 may determine that the selected (e.g., and assigned) PPP is untrusted. The gateway may determine the selected PPP is untrusted by attempting to verify a Transport Layer Security (TLS) certificate associated with the selected PPP, but ultimately fails to verify the certificate. The gateway device 104 may determine the selected PPP is untrusted by attempting to verify the Domain Name Service (DNS) record associated with the selected PPP, but ultimately fails to verify the record. The gateway device 104 may also select a PPP based on one that is known to be the closest to a particular type of content with which the user wishes to access or interact (e.g., a specific gaming server), the available network or computational capacity of a PPP to route traffic, or other criteria. The gateway device 104 may determine to route a portion or more of the data associated with the user device without using the selected PPP, as shown in routing decision 112. If there is no assigned PPP to the user device, the gateway device 104 may route traffic traditionally, as shown in routing decision 112.

The network device 106 may determine an association of the gateway device 104 and one or more of the available PPP 108a-108n. The network device 106 may send to the gateway device 104 information indicating the one or more PPPs 108a-108n associated with the gateway device 104, such as PPP 108b. The association of the gateway device 104 and the associated PPP 108b may indicate a previous assignment, to the gateway device 104, of the PPP 108b. The association of the gateway device 104 and the associated PPP 108b may indicate a locational proximity of the gateway device 104 to the PPP 108b. The association of the gateway device 104 and the associated PPP 108b may indicate a user selection of the PPP 108b from the available PPPs. The gateway device 104 may associate a PPP, such as PPP 108b, and the user device 102. The gateway device 104 may route data associated with the user device 102 via the associated PPP 108b, as shown in routing decision 110. The gateway device 104 may route data associated with the user device 102 without using the associated PPP 108b, as shown in routing decision 112.

Figure 2:
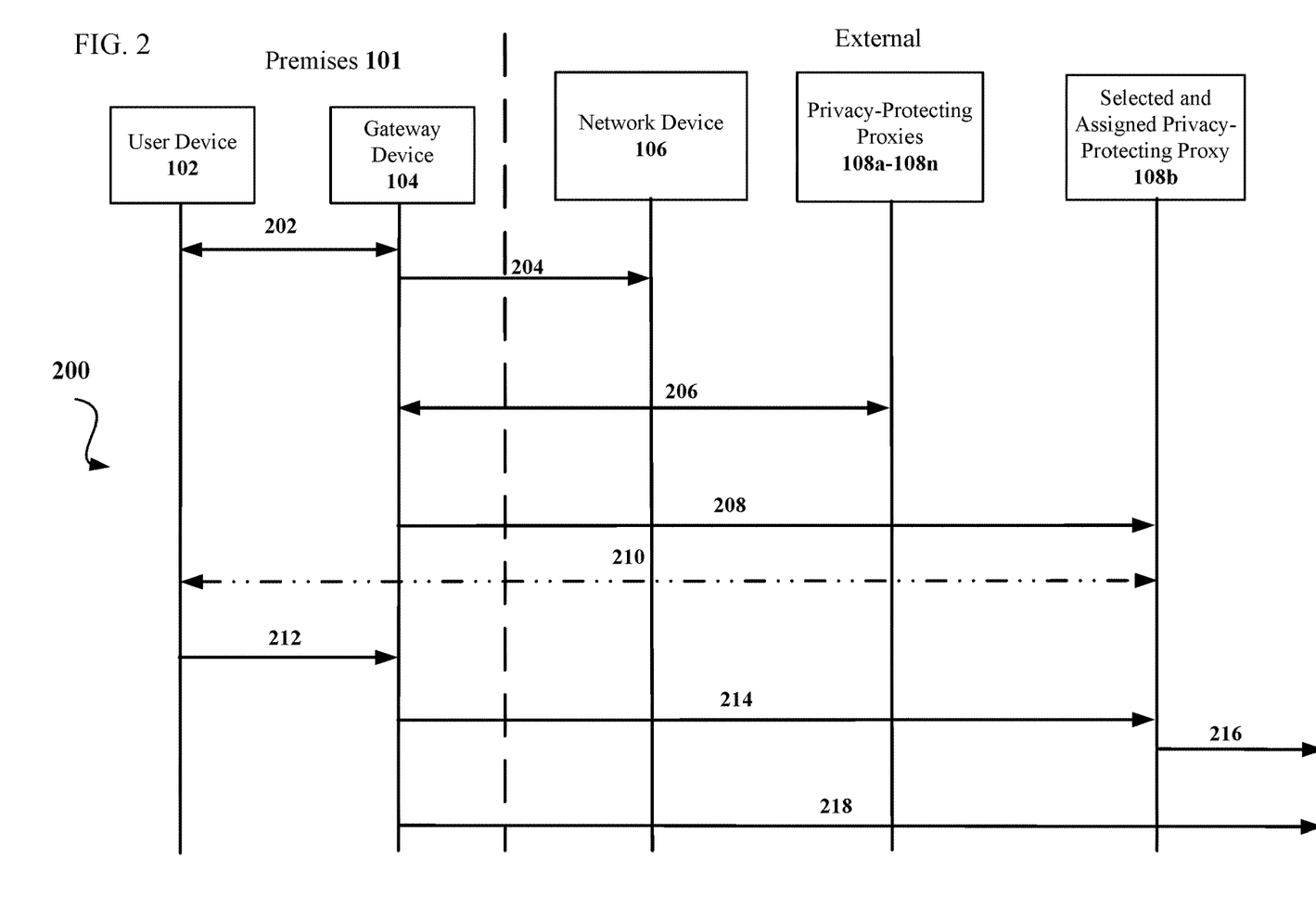
FIG. 2 shows an example network processing chart.

FIG. 2 shows an example process 200. The process may be employed in a system, such as system 100 of FIG. 1. The process may be used as in a method for discovery and assignment of privacy-protecting proxies/relays in a service provider network, such as the service provider network 107 in FIG. 1.

At step 202, the user device 102, which may be located at the premises 101, connects to the gateway device 104 and indicates that the user device is attempting to establish a connection with the network, such as service provider network 107 in FIG. 1. The user device 102 may have opt-in privacy settings enabled that request the use of a PPP while connected to the network. The gateway device 104 may determine that the user device 102 traffic would benefit from using a PPP without the user device 102 requesting the use of a PPP. For example, the gateway device 104 may determine the user device 102 is attempting to navigate to a banking website.

At step 204, the gateway device 104 may be configured to request from the network device 106 a list of the available PPPs 108a-108n on the service provider network 107.

At step 206, the network device 106 may send the gateway device 104 a list of the available PPPs 108a-108n. The gateway device 104 may select one of the available PPPs based on selection criteria, such as data indicating location information of the one or more PPPs available, data indicating a user selection of the PPP from the one or more PPPs available, data indicating a capacity of the one or more PPPs available, or other criteria useful for selecting a PPP. The gateway device 104 may also select a PPP based on one that is known to be the closest to a particular type of content with which the user wishes to access or interact (e.g., a specific gaming server), the available network or computational capacity of a PPP to route traffic, or other criteria.

At step 208, the gateway device 104 may determine if the selected PPP is trusted. The gateway device 104 may determine the selected PPP is trusted by verifying a Transport Layer Security (TLS) certificate associated with the selected PPP. The gateway device 104 may determine the selected PPP is trusted by verifying the Domain Name Service (DNS) record associated with the selected PPP. If the gateway device 104 determines that the selected PPP is trusted, the gateway device may assign the selected PPP 108b to the user device 102 at step 210. The selection of the PPP 108b and/or assigning of the PPP 108b may be performed in a single step or a series of steps. However, if the gateway device 104 determines that the selected PPP is untrusted or that the user device 102 would not benefit from the user of a PPP, the process moves to step 212.

At step 210, the gateway device 104 may assign the selected PPP 108b to the user device 102. The user device 102, gateway device 104, and/or the network device 106 may be configured to store settings, configurations, or the like, related to the assignment and association of the selected (e.g., and assigned) PPP 108b and the user device 102. If the user device 102, gateway device 104, and/or the network device 106 already stored a setting, configuration, or the like related to the assignment and association of the PPP 108b and the user device 102 then the user device 102, gateway device 104, and/or the network device 106 may update the settings, configurations, or the like, related to the assignment and association of the selected PPP 108b and the user device 102.

At step 212, the user device 102 may send data to the gateway device 104 to be routed. If the user device 102 has been assigned a PPP, such as PPP 108b, the process may move to step 214. Otherwise, if the user device 102 has not been selected and/or assigned a PPP, the process may move to step 218.

At step 214, the gateway device 104 may route at least a portion of the data associated with the user device 102 via the assigned PPP 108b, as shown in routing decision 110 of FIG. 1. The gateway device 104 may be configured to route only specific data based on a security policy, or some other setting, associated with user device 102. Other portions of data not specified by the security policy, or some other setting, may be routed traditionally, without the use of a PPP, as shown in routing decision 112 of FIG. 1.

At step 216, the routed data may reach the destination obfuscated by the selected (e.g., and assigned) PPP 108b. At step 218, the gateway device 104 may determine that the data associated with the user device 102 should be routed traditionally, without the use of a PPP, as shown in routing decision 112 of FIG. 1.

Figure 3:
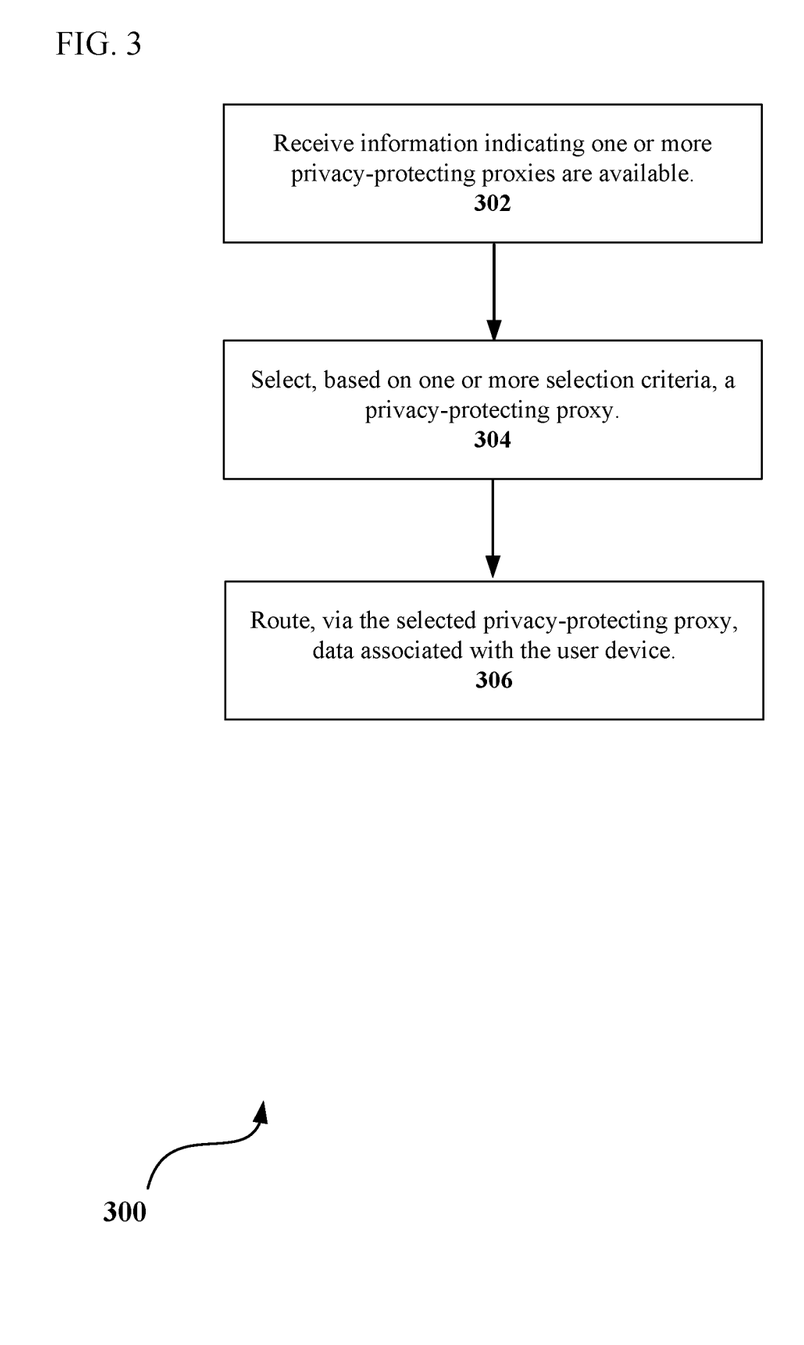
FIG. 3 shows an example method.

FIG. 3 shows an example method 300. The method may be employed in a system, such as system 100 of FIG. 1 using the network processing chart 200 of FIG. 2. The method may be used for discovery and assignment of privacy-protecting proxies/relays in a service provider network, such as the service provider network 107 in FIG. 1.

At step 302, a gateway device (e.g., or other computing device, network device), such as gateway device 104 at premises 101, may send a request to a network device located external to the premises, such as network device 106 for data indicating one or more PPPs available to the gateway device 104. The request may be sent based on receiving data from a user device, such as data to communicate with an application service, or data to connect to a network.

At step 304, the gateway device 104 may select a PPP from the one or more PPPs made available to the gateway device 104 based on one or more selection criteria, such as data indicating location information of the one or more PPPs available, data indicating a user selection of the PPP from the one or more PPPs available, data indicating a capacity of the one or more PPPs available, or other criteria useful for selecting a PPP. The gateway device 104 may assign (e.g., or associate) the selected PPP to a user device. The selection and assigning of a PPP may be performed in a single step or a series of steps. The user device may comprise a user device located at the premises, such as user device 102. The assignment may be based on a determination that the selected PPP is trusted. The gateway device 104 may determine the selected PPP is trusted by verifying a Transport Layer Security (TLS) certificate associated with the selected PPP. The gateway device 104 may determine the selected PPP is trusted by verifying the Domain Name Service (DNS) record associated with the selected PPP. The verification of a PPP being a trusted PPP in may be determined before, after, or at the same time of selection of a PPP in step 304.

At step 306, the gateway device 104 may route incoming data associated with the user device 102 via the assigned PPP. The gateway device 104 may be configured to route only specific data based on a security policy, or some other setting, associated with user device 102. Other data not specified by the security policy, or some other setting, may be routed normally, without the use of a PPP.

Figure 4:
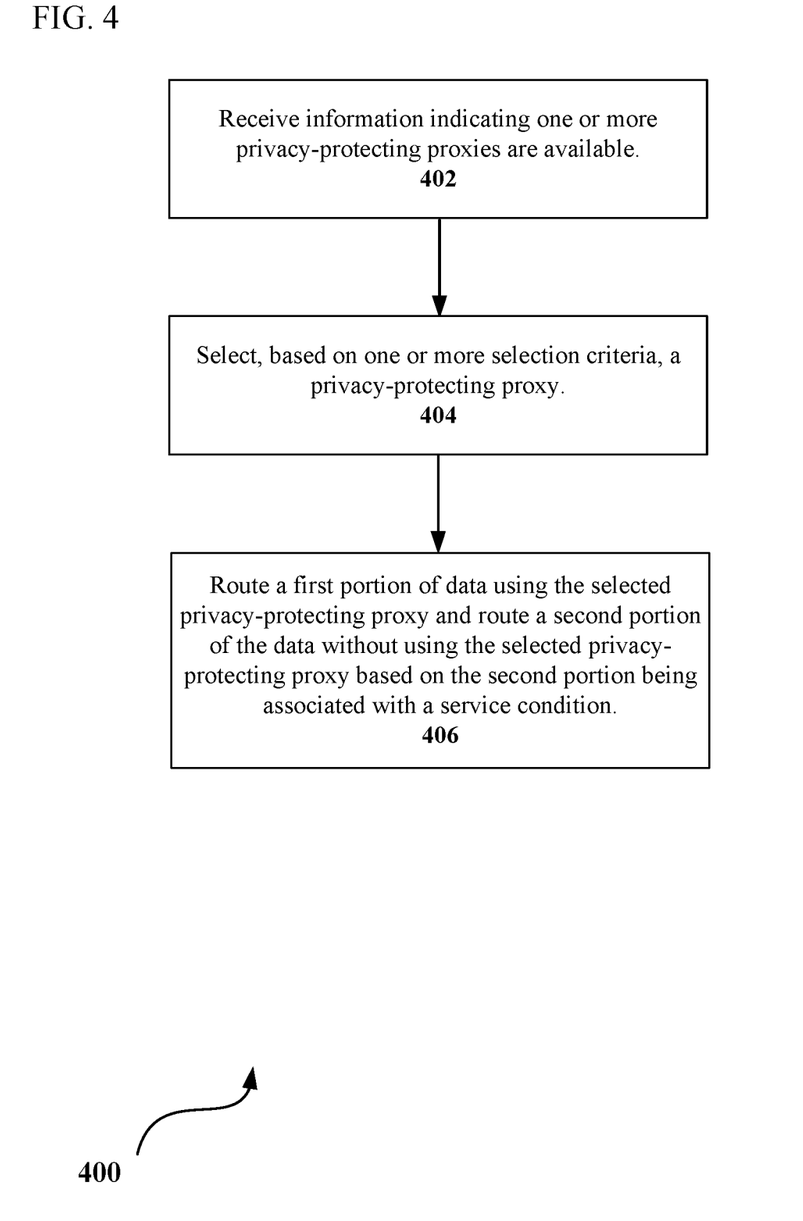
FIG. 4 shows an example method.

FIG. 4 shows an example method 400. The method may be employed in a system, such as system 100 of FIG. 1 using the network processing chart 200 of FIG. 2. The method may be used for discovery and assignment of privacy-protecting proxies/relays in a service provider network, such as the service provider network 107 in FIG. 1.

At step 402, a gateway device located at a premises, such as gateway device 104 at premises 101, may send a request to a network device located external to the premises, such as network device 106 for data indicating one or more PPPs available to the gateway device 104. The request may be sent based on receiving data from a user device, such as data to communicate with an application service, or data to connect to a network.

At step 404, the gateway device 104 may select a PPP from the one or more PPPs made available to the gateway device 104 based on one or more selection criteria, such as data indicating location information of the one or more PPPs available, data indicating a user selection of the PPP from the one or more PPPs available, data indicating a capacity of the one or more PPPs available, or other criteria useful for selecting a PPP. The gateway device 104 may assign the selected PPP to a user device located at the premises, such as user device 102. The selection and assigning of a PPP may be performed in a single step or a series of steps. The gateway device 104 determining whether to assign the selected PPP may be based on a determining whether the selected PPP is trusted. The gateway device 104 may determine the selected PPP is untrusted by attempting to verify a Transport Layer Security (TLS) certificate associated with the selected PPP but failing to verify the certificate. The gateway device 104 may determine the selected PPP is untrusted by attempting to verify the Domain Name Service (DNS) record associated with the selected PPP but failing to verify the record. The gateway device 104 may determine the selected PPP is trusted by verifying a Transport Layer Security (TLS) certificate associated with the selected PPP. The gateway device 104 may determine the selected PPP is trusted by verifying the Domain Name Service (DNS) record associated with the selected PPP. The verification of a PPP being a trusted PPP may be determined before, after, or at the same time of selection of a PPP in step 404.

At step 406, the gateway device 104 may route a first portion of data associated with the user device 102 using the selected PPP and route a second portion of the data associated with the user device 102 without using the selected PPP, based on the second portion of data being associated with a service condition. A service condition may be a requirement by the user device 102 or gateway device 104 to use local location information of the user device 102 to access a particular service. By routing the second portion of data in a traditional manner without using the selected (e.g., and assigned) PPP then the local location information of the user device 102 may still be available for content localization services. For example, the user device 102 might be a smart thermostat, which may need to disclose location data to properly heat or cool a room. Routing a portion of data without using the selected PPP, may not result in the selected PPP becoming deselected or reassigned elsewhere.

Figure 5:
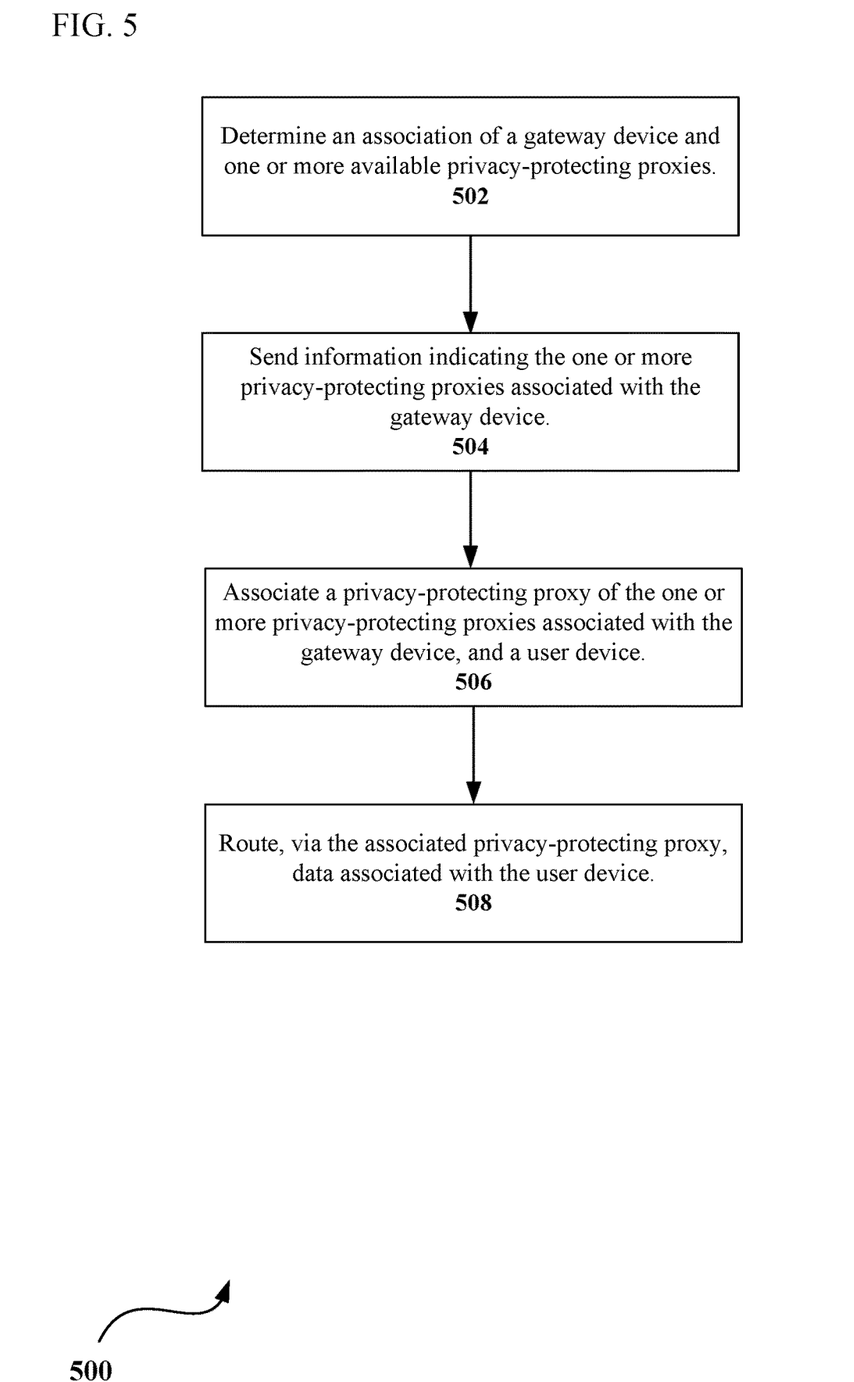
FIG. 5 shows an example method.

FIG. 5 shows an example method 500. The method may be employed in a system, such as system 100 of FIG. 1 using the network processing chart 200 of FIG. 2. The method may be used for discovery and assignment of privacy-protecting proxies/relays in a service provider network, such as the service provider network 107 in FIG. 1.

At step 502, a network device located external to a premises, such as network device 106 external to premises 101, may receive a request from a gateway device located at a premises, such as the gateway device 104 located at premises 101, for data indicating one or more PPPs available. The request may be received based on the gateway device receiving data from a user device, such as data to communicate with an application service, or data to connect to a network. The network device 106 may determine an association between the gateway device 104 and one or more available PPPs, such as PPPs 108a-108n. The association may be determined based on at least one of a previous assignment, to the gateway device 104, of one or more PPPs of the one or more PPPs available, a locational proximity, to the gateway device 104, of one or more PPPs of the one or more PPPs available, or a user selection of one or more PPPs of the one or more PPPs available.

At step 504, the network device 106 may send to the gateway device 104 data indicating the one or more PPPs associated with the gateway device 104.

At step 506, the gateway device 104 may associate a PPP of the one or more PPPs associated with gateway device 104, such as PPP 108b, and a user device located at the premises, such as user device 102. The gateway device 104 may determine the associated PPP is trusted by verifying a Transport Layer Security (TLS) certificate associated with the assigned PPP. The gateway device 104 may determine the assigned PPP is trusted by verifying the Domain Name Service (DNS) record associated with the PPP.

At step 508, the gateway device 104 may route incoming data associated with the user device 102 via the associated PPP. The gateway device 104 may route data associated with the user device 102 via the associated PPP 108b, as shown in routing decision 110 of FIG. 1. The gateway device 104 may route data associated with the user device 102 without using the associated PPP 108b, as shown in routing decision 112 of FIG. 1.

Figure 6:
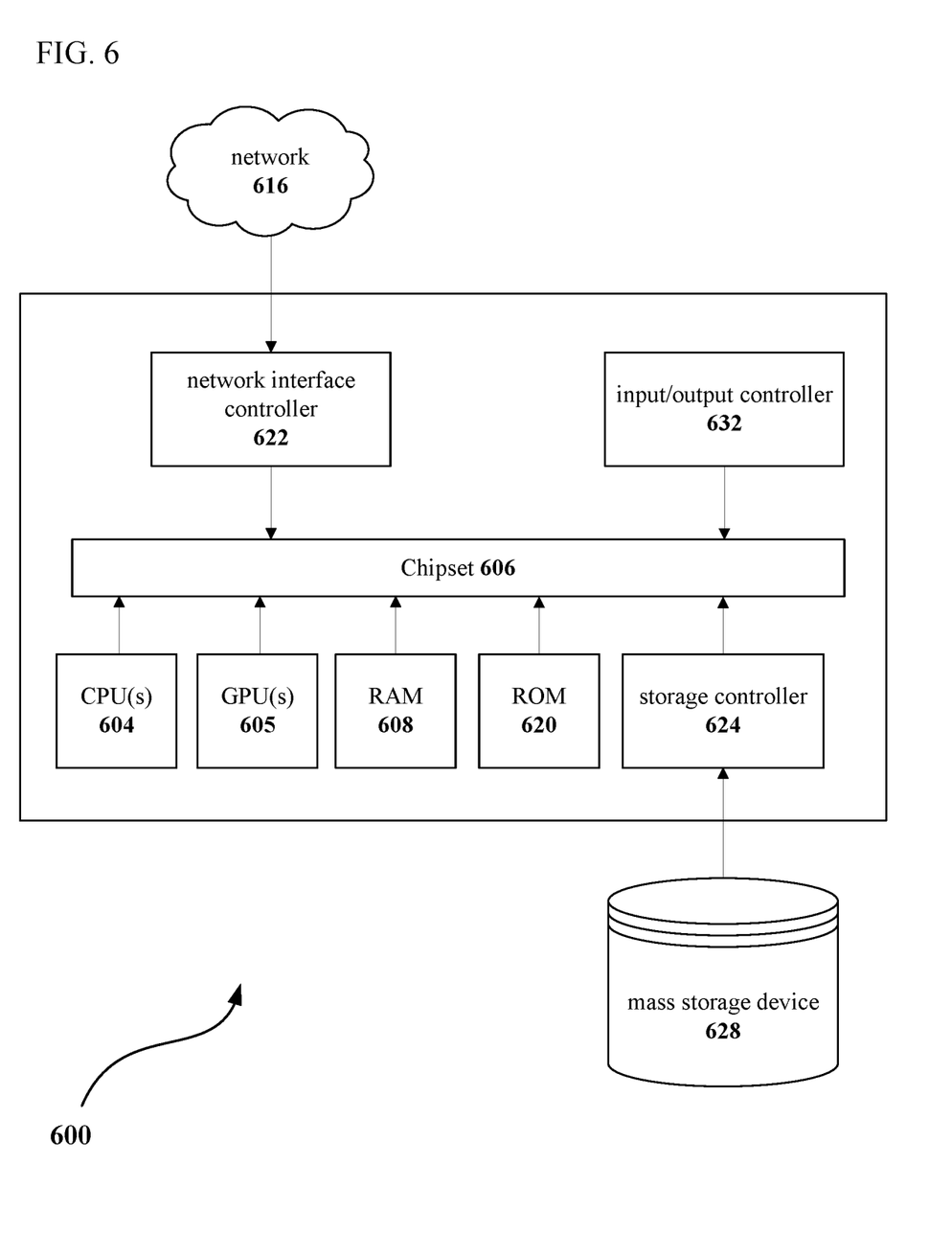
FIG. 6 shows an example computing system.

FIG. 6 shows an example computing device 600 that may represent any of the various devices or entities shown in FIG. 1, including, for example, the user device 102, the gateway device 104, the network device 106, the PPPs 108a-108n, or the selected (e.g., and assigned) PPP 108b. That is, the computing device 600 shown in FIG. 6 may comprise any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the system of FIG. 1, the network processing chart of FIG. 2, or any of the methods described in relation to FIGS. 3-5.

The computing device 600 may comprise a baseboard, or "motherboard," which is a printed circuit board to which a multitude of components or devices may be connected by way of a system bus or other electrical communication paths. One or more central processing units (CPUs or "processors") 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally comprise electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, or the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random-access memory (RAM) 608 used as the main memory in the computing device 600. The chipset 606 may provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems of the system 100. The chipset 606 may comprise functionality for providing network connectivity through a network interface controller (NIC) 622. A NIC 622 may be capable of connecting the computing device 600 to other computing nodes over the system 100. It should be appreciated that multiple NICs 622 may be present in the computing device 600, connecting the computing device to other types of networks and remote computer systems. The NIC 622 may be configured to implement a wired local area network technology, such as IEEE 802.3 ("Ethernet") or the like. The NIC 622 may also comprise any suitable wireless network interface controller capable of wirelessly connecting and communicating with other devices or computing nodes on the system 100. For example, the NIC 622 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 600 may be connected to a mass storage device 628 that provides non-volatile storage (i.e., memory) for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may comprise, but are not limited to, the technology used to implement the physical storage units and whether the mass storage device 628 is characterized as primary or secondary storage or the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may comprise volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 3-5.

A computing device, such as the computing device 600 depicted in FIG. 6, may also comprise an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not comprise all of the components shown in FIG. 6, may comprise other components that are not explicitly shown in FIG. 6, or may utilize an architecture completely different than that shown in FIG. 6.

As described herein, a computing device may be a physical computing device, such as the computing device 600 of FIG. 6. A computing device may also comprise a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is not intended to be limiting.

As used in the specification and the appended claims, the singular forms "a," "an," and "the" comprise plural referents unless the context clearly dictates otherwise. Ranges may be expressed herein as from "about" one particular value, and/or to "about" another particular value. When such a range is expressed, another example may comprise from the one particular value and/or to the other particular value. It will be further understood that the endpoints of each of the ranges are significant both in relation to the other endpoint, and independently of the other endpoint.

"Optional" or "optionally" means that the subsequently described event or circumstance may or may not occur, and that the description comprises instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers, or steps. "Exemplary" means "an example of.". "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any combination of the described methods.

As will be appreciated by one skilled in the art, the methods and systems may take the form of entirely hardware, entirely software, or a combination of software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

The methods and systems are described above with reference to block diagrams and flowcharts of methods, systems, apparatuses, and computer program products. It will be understood that each block of the block diagrams and flowcharts, and combinations of blocks in the block diagrams and flowcharts, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added or removed. The example systems and components described herein may be configured differently than described. For example, elements may be added to, removed from, or rearranged.

It will also be appreciated that various items are shown as being stored in memory or on storage while being used, and that these items or portions thereof may be transferred between memory and other storage devices for purposes of memory management and data integrity. Alternatively, some or all of the software modules and/or systems may execute in memory on another device and communicate with the shown computing systems via inter-computer communication. Furthermore, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms. Accordingly, the present invention may be practiced with other computer system configurations.

While the methods and systems have been described in connection with specific examples, it is not intended that the scope be limited to the specific examples set forth.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including matters of logic with respect to arrangement of steps or operational flow and the plain meaning derived from grammatical organization or punctuation.

It will be apparent to those skilled in the art that various modifications and variations may be made without departing from the scope or spirit of the present disclosure. Alternatives will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving, by a gateway device located at a premises and from a network device located external to the premises, information indicating one or more privacy-protecting proxies available to the gateway device;
   selecting, by the gateway device and based on one or more selection criteria, a privacy-protecting proxy from the one or more privacy protecting proxies available to the gateway device; and
   based on associating the selected privacy-protecting proxy with a user device among a plurality of user devices at the premises, routing data associated with the user device via the selected privacy-protecting proxy.

2. The method of claim 1, wherein the one or more selection criteria comprises data indicating location information of the one or more privacy-protecting proxies available.

3. The method of claim 1, wherein the one or more selection criteria comprises data indicating a user selection of the privacy-protecting proxy from the one or more privacy-protecting proxies available.

4. The method of claim 1, wherein the one or more selection criteria comprises data indicating a capacity of the one or more privacy-protecting proxies available.

5. The method of claim 1, wherein the gateway device comprises one or more of a modem, a cable modem, a set-top box, a media streaming device, or a router.

6. The method of claim 1, wherein the selecting the privacy-protecting proxy further comprises determining the privacy-protecting proxy is trusted.

7. The method of claim 6, wherein the determining the privacy-protecting proxy is trusted further comprises at least one of:
   verifying a Transport Layer Security (TLS) certificate associated with the privacy-protecting proxy; or
   verifying a Domain Name Service (DNS) record associated with the privacy-protecting proxy.

8. The method of claim 1, wherein the network device comprises one or more of a network access device, a server device, or a DHCP server.

9. The method of claim 1, wherein the receiving information indicating the one or more privacy-protecting proxies available to the gateway device further comprises sending a DNS query to the network device.

10. A method comprising:
    receiving, by a gateway device located at a premises and from a network device located external to the premises, information indicating one or more privacy-protecting proxies available to the gateway device;
    selecting, by the gateway device and based on one or more selection criteria, a privacy-protecting proxy from the one or more privacy protecting proxies available to the gateway device; and
    routing a first portion of data associated with a user device using the selected privacy-protecting proxy and routing a second portion of the data without using the selected privacy-protecting proxy based on the second portion being associated with a service condition.

11. The method of claim 10, wherein the one or more selection criteria comprises data indicating location information of the one or more privacy-protecting proxies available.

12. The method of claim 10, wherein the one or more selection criteria comprises data indicating a user selection of the privacy-protecting proxy from the one or more privacy-protecting proxies available.

13. The method of claim 10, wherein the one or more selection criteria comprises data indicating a capacity of the one or more privacy-protecting proxies available.

14. The method of claim 10, wherein the gateway device comprises one or more of a modem, a cable modem, a set-top box, a media streaming device, or a router.

15. The method of claim 10, wherein the service condition requires local location information of the user device to access a service.

16. The method of claim 10, wherein the selecting the privacy-protecting proxy further comprises at least one of:
    verifying a Transport Layer Security (TLS) certificate associated with the privacy-protecting proxy; or
    verifying a Domain Name Service (DNS) record associated with the privacy-protecting proxy.

17. A method comprising:
    determining, by a network device located external to a premises, an association of a gateway device located at the premises and one or more privacy-protecting proxies of the one or more privacy-protecting proxies available;
    sending, to the gateway device, information indicating the one or more privacy-protecting proxies associated with the gateway device;

associating a privacy-protecting proxy, of the one or more privacy-protecting proxies associated with the gateway device, and a user device located at the premises; and routing, via the associated privacy-protecting proxy, data associated with the user device.

18. The method of claim 17, wherein the gateway device comprises one or more of a modem, a cable modem, a set-top box, a media streaming device, or a router.

19. The method of claim 17, wherein the network device comprises one or more of a network access device, a server device, or a DHCP server.

20. The method of claim 17, wherein the association of the gateway device and the one or more privacy-protecting proxies of the one or more privacy-protecting proxies available indicates at least one of:

a previous assignment, to the gateway device, of the one or more privacy-protecting proxies of the one or more privacy-protecting proxies available, a locational proximity, to the gateway device, of the one or more privacy-protecting proxies of the one or more privacy-protecting proxies available, or a user selection of the one or more privacy-protecting proxies of the one or more privacy protecting proxies available.

* * * * *